March 29, 1960 L. B. CARPENTER ET AL 2,930,893
LONG PATH INFRARED DETECTION OF ATMOSPHERIC CONTAMINANTS
Filed May 21, 1956 2 Sheets-Sheet 1
Fig. 1.
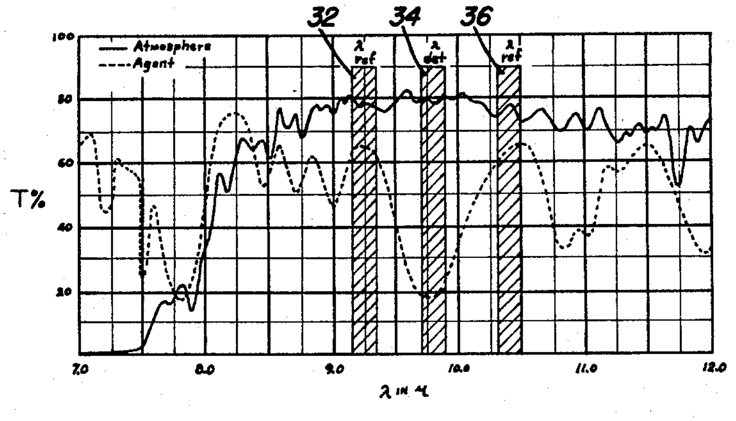
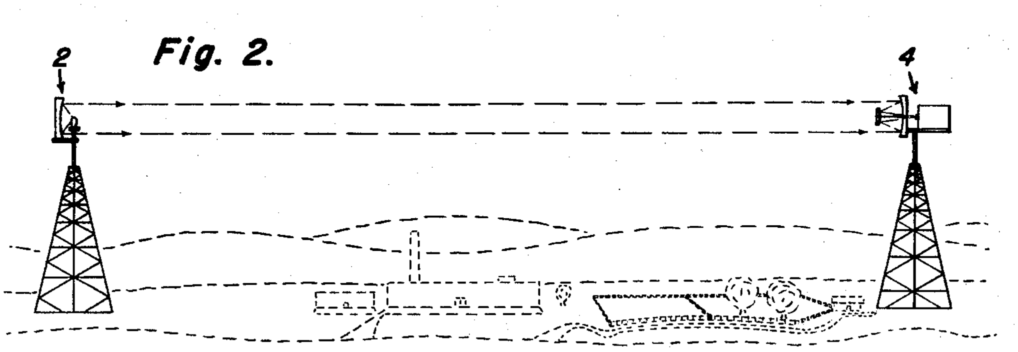
Fig. 2.
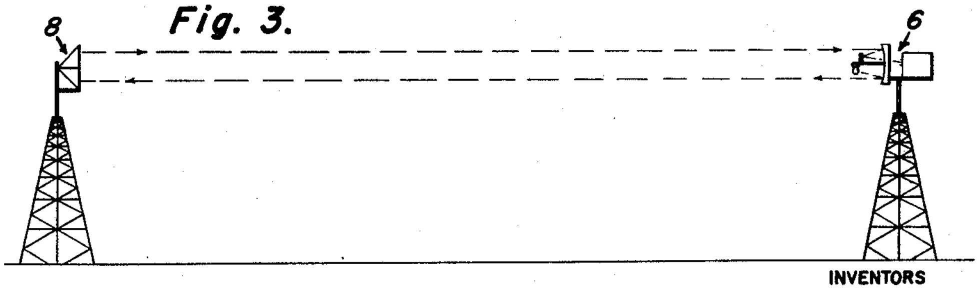
Fig. 3.
INVENTORS
Lane B. Carpenter
Saul Hormats
Harvey Tannenbaum
BY George Renehan
Attorney

LONG PATH INFRARED DETECTION OF ATMOSPHERIC CONTAMINANTS

Filed May 21, 1956 2 Sheets-Sheet 2

INVENTORS
Lane B. Carpenter
Saul Hormats
Harvey Tannenbaum
BY George Renehan
Attorney United States Patent Office 2,930,893

Patented Mar. 29, 1960

2,930,893

LONG PATH INFRARED DETECTION OF ATMOSPHERIC CONTAMINANTS

Lane B. Carpenter, Lutherville, and Saul Hormats and Harvey Tannenbaum, Baltimore, Md., assignors to the United States of America as represented by the Secretary of the Army Application May 21, 1956, Serial No. 586,334

8 Claims. (Cl. 250—43.5)

(Granted under Title 35, U.S. Code (1952), sec. 266)

The invention described herein may be manufactured and used by or for the Government of the United States of America for governmental purposes without the payment to us of any royalty thereon.

This invention is directed to the use of long-path infrared radiation to detect minute quantities of atmospheric contaminants, particularly highly toxic chemical warfare agents. It is particularly directed to the detection of "nerve gases" such as isopropyl methylphosphono fluoridate, also known as "sarin," in quantities of the order of .01 microgram, i.e., $1\times10^{-5}$ mg., per liter of air, and other compounds containing a pentavalent phosphorus ester linkage, $$-\overset{\|}{\underset{|}{P}}-O-(R)$$

(R) being an organic radical linked to the oxygen by a carbon-oxygen band.

By the term "long-path infrared radiation," we refer to infrared radiation transmitted through the ambient atmosphere, as distinguished from a test cell or the like, for distances of the order of fifty yards or more.

The potential use in warfare of the "nerve gases" such as sarin poses a serious problem of detection because of the lack of odor and extreme toxicity of these agents.

One of the methods that has suggested itself to those concerned with the problem is the use of infra-red gas analysis. This method has previously been employed as as laboratory method, particularly for the detection and measurement of carbon dioxide. The infra-red absorption of the atmosphere has also been studied, using the sun as a source. Neither technique has proven satisfactory for our purpose. The laboratory methods are not sufficiently sensitive to detect the minute quantities of contaminants referred to above. Moreover, they permit the detection of the contaminants only at the particular point where a sample is taken. The plotting of the absorption spectrum of the atmosphere is too slow a procedure to be satisfactory for our purpose.

We have devised a method and apparatus which makes it possible to detect very quickly the presence of sarin within a large area of, say, a city. By the proper choice of operating conditions it may also be applied to the detection of numerous other atmospheric contaminants.

In the drawing:

Fig. 1 is a graph showing the transmission curves for the atmosphere and the toxic agent sarin, and showing the reference and detection bands employed in our method.

Fig. 2 is a diagrammatic view showing the general arrangement of one embodiment of our invention.

Fig. 3 is a view similar to Fig. 1, but showing another embodiment of our invention.

Figure 4:
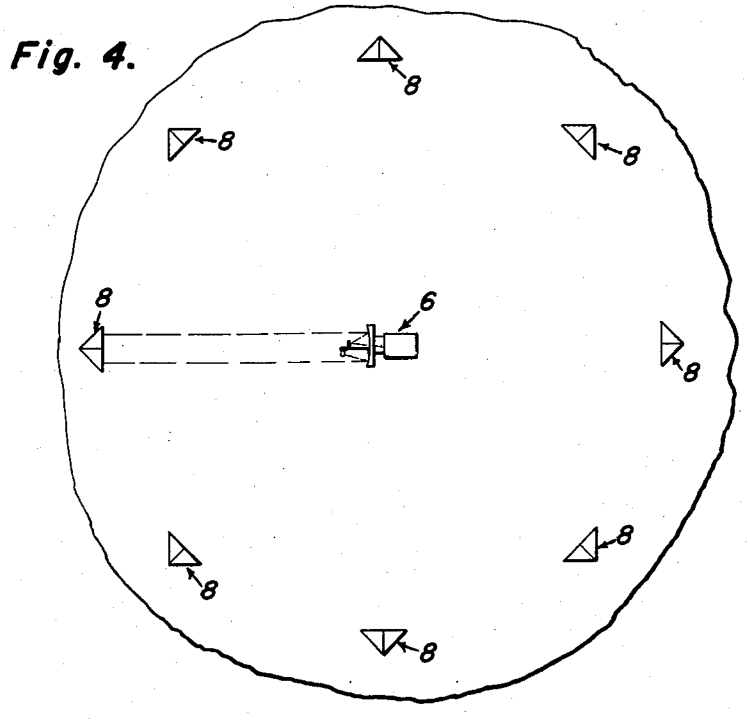
Fig. 4 is a plan view showing a further refinement of the embodiment of Fig. 3.

Our method involves the transmission over a long-path through the ambient atmosphere of a beam of radiation including infra-red frequencies. We separate from the beam at least two narrow infra-red spectral bands which fall within one of the so-called "atmospheric windows," i.e., regions of high transmission. For the detection of sarin and other compounds having the pentavalent phosphorus-ester linkage, we prefer the range of 8 to 13 microns, falling between the strong absorption regions of carbon dioxide and water. One of these bands, which we term the detection band, is taken at a wavelength at which the contaminant to be detected exhibits strong absorption. One or more bands, which we term reference bands, are taken at wavelengths where the agent exhibits little or no absorption. These bands should have a width of not more than about .3 micron.

Fig. 1, we have shown a suitable choice of detection and reference wavelengths for the detection of sarin, i.e. a detection band $\lambda$ det., at a mean wavelength of 9.8 microns, a first reference band, $\lambda$ ref., at a mean wavelength of 9.25 microns and a second reference band at a mean wavelength of 10.4 microns.

The effect of the presence or absence of sarin on the intensity of these bands will be apparent from Fig. 1. The addition of sarin to the atmosphere will markedly decrease the transmission of the detection band but will only slightly affect the reference wavelengths. Hence, there will be a change in the relative intensity of the detection band as compared to the reference bands.

On the other hand, opaque objects, dust, clouds, etc., will effect all three bands to the same degree, the bands being chosen close together so as to minimise the effect of any selective attenuation due to scattering.

The use of two reference bands reduces the likelihood of any other contaminant causing a false alarm. For example, ethyl alcohol has an absorption band at about 9.5 microns, which normally falls outside the detection band. At very high concentrations, however, the alcohol band is broadened to such an extent as to cause attenuation of the detection band. If only the 10.4 reference band were used this would reduce the ratio of the detection signal and sound the alarm. Use of the 9.25 micron detection band largely eliminates this possibility, since the broadening of the alcohol absorption band also attenuates this reference wavelength. The manner in which the attenuation of the detection wavelength is compared with that of the two reference wavelengths will later be described in detail. For greater certainty still more reference bands might be added, e.g. at a mean wavelength of about $11.5\mu$. Furthermore, more than one detection band may be employed, e.g. at 9.8 and 11.95 microns.

It will be noted that the detection and reference bands are narrow, on the order of $0.2\mu$ in Fig. 1. This is in marked contrast to the common practice in connection with infrared analysers, of employing two wide, overlapping spectral bands, one of which includes a region of high absorption of the gas to be measured or detected. Our use of the very narrow spectral bands produces far greater sensitivity and also gives results which are much less affected by other changes in the composition of the atmosphere. The combination of this expedient with the use of the long path referred to above makes it possible to successfully carry out area scanning and detect minute quantities of atmospheric contaminants.

We detect and compare the transmission of the various bands by suitable electronic means.

Our apparatus comprises basically a source of infrared radiation and a receiver so positioned relative to the source that the radiation traverses a path through the ambient atmosphere which should be at least about 50 yards and which may advantageously be several hundred yards in length. As shown in Fig. 2 the source 2 and the detector 4 may be separated by the required distance. Most advantageously, however, the radiation is directed from the source to a reflector and then back to a detector which is adjacent the source. Such an arrangement is shown in Figs. 3 and 4, wherein 6 represents a source-receiver unit and 8 a reflector. The nature of one form of these units is shown more clearly in Fig. 5 and is described below. The source-receiver assembly may be mounted on a turn-table encircled at a distance of, say, 500 yards by a series of mirrors (see Fig. 4). By directing the beam successively at different mirrors 8, a circular area 1000 yards in diameter may thus be scanned.

Since objects at normal temperature emit radiation in our preferred range, we prefer the use of a source which is coded, e.g. by means of a chopper, in order that the path length may be accurately known.

Figure 5:
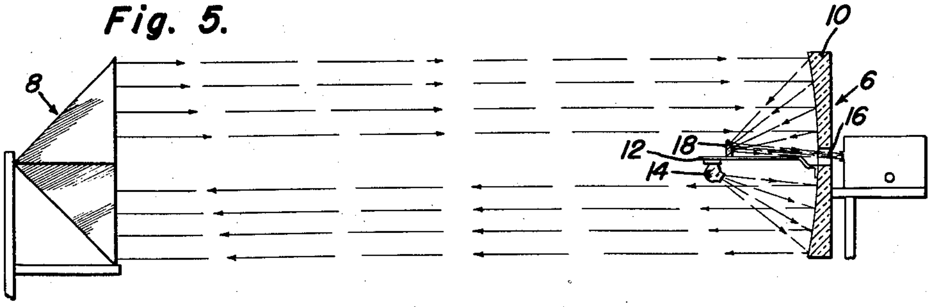
Fig. 5 is an enlarged view showing the optical system of the embodiment of Fig. 2.

A typical optical system for use in the embodiments of Figs. 2 and 3 is shown in Fig. 5. This system is composed of autocollimating (transceiver) type optics. With a well aligned triple mirror, this system requires little further alignment.

Referring to Fig. 5, the transmitter-receiver unit 6 comprises a concave primary mirror 10, which is divided by an opaque baffle 12. On one side of the baffle is source 14 of chopped infra-red radiation. Any conventional source of infra-red radiation may be used, for example, those discussed in the Review of Scientific Instruments, vol. 19, pages 147 and 148 (1948). Any type of chopper, e.g. a rotating shutter, may be employed.

On the other side of baffle 12 is an aperture 16 and a secondary mirror 18. The functions of these parts will be described later.

The reflector 8 is a right angled trihedral mirror or cube-corner mirror, composed of three mutually perpendicular surfaces. The optical properties of such a reflector are described by J. L. Synge "Reflection in a Corner Formed by Three Plane Mirrors," Applied Mathematics, Quarterly, vol. 4, No. 2, July 1946. Briefly stated, it serves to reflect a beam back to its source with a 180° phase shift of the image. Compared to a plane mirror it is quite insensitive to variations in position.

Radiation from source 14 is delivered only to the one half of concave primary mirror 10, which directs it to reflector 8. It is returned to the other half of mirror 10, and focussed on secondary mirror 18, which directs it through aperture 16 to an illuminator-detector system, which will now be described.

Figure 6:
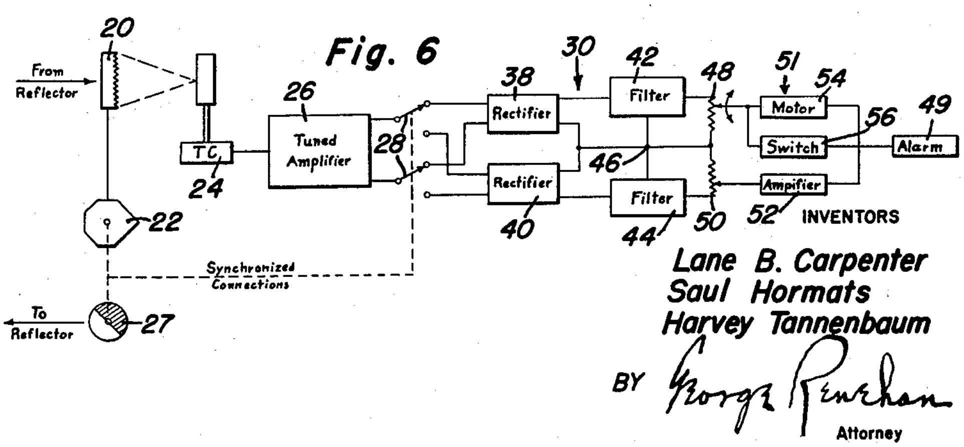
Fig. 6 is a diagrammatic view of a detection system.

Referring to Fig. 6, we provide an echelette grating 20 driven by a cam 22 in such a manner as to successively deliver radiation of different wavelengths to thermocouple 24. Echelette gratings are well known dispersing elements employed in infrared spectrometry. See for example Williams "Infra-Red Instrumentation and Techniques," Review of Scientific Instruments, vol. 19, pages 135–178 (1948), particularly pages 149 and 150, and references cited therein.

The thermocouple signals are amplified by tuned amplifier 26, which is so tuned as to respond to signals of the frequency delivered by light chopper 27 from source 14. Selector switches 28 deliver the signals to the comparator circuit indicated generally at 30.

The operation up to this point is as follows. The cam 22 shifts the grating 20 in such a manner that the wavelengths indicated in Fig. 1 are successively focussed on thermocouple 24 in the following order: (*a*) reference wavelength 32, (*b*) detection wavelength 34, (*c*) reference wavelength 36, (*d*) detection wavelength 34. Selector switches 28 are synchronized with cam 22 so as to deliver the two signals from reference wavelengths 32 and 36 to one arm of the comparator circuit and the two signals from detection wavelengths 34 to the other arm. The stored signals in the two arms of the circuit are compared and their ratio determined. The presence of the toxic agent in the atmosphere will cause a reduction in the ratio of the sum of the two signals from the detection wavelength to the sum of the signals from the two reference wavelengths. This change in ratio may be used to operate an alarm.

The comparator circuit illustrated here is of the same type as that disclosed by Hornig et al., Journal of the Optical Society of America, vol. 40, pp. 497–503 (1950).

The push-pull output of amplifier 26 is delivered to one of two full-wave vacuum tube rectifiers 38, 40. The rectifier outputs charge filter circuits 42, 44. The time constant of the two comparator arms to a common center 46 is selected to store energy for that length of time required for the reception of the two signals to each arm described above. Filter 42 is connected to one end of an automatically controlled potentiometer 48 and filter 44 to one end of manually adjusted voltage divider 50. The other ends of potentiometer 48 and of voltage divider 50 are connected to the electrical center 46.

The alarm is actuated by a servo loop 51 which will now be described.

The voltage divider 50 delivers direct current to servo-amplifier 52, which feeds 60 cycle A.C. to motor 54, which drives the swinger of potentiometer 48. Motor 54 is a two phase 60 cycle motor, one phase being generated in amplifier 52 and the other being the 60 cycle line supply.

Since the voltage from one arm of circuit 30 feeds amplifier 52 and another is across motor driven potentiometer 48, the servo controlled balancing amplifier 52 will cause the motor to move until an equal voltage appears across the amplifier input and the condition of null is found. The operation of the motor driven potentiometer may now be altered by adjusting the manual voltage divider 50 to drive the motor operated (servo) potentiometer 48 to a different starting point or place or rest (null).

Since the storage and subsequent discharge paths through the two voltage dividers are of such time constant as to provide a once-around selection of wavelengths by cam 22, it is apparent that a decrease in the voltage to one arm, such as would result during attenuation of the energy at middle wavelength 34 during the time this is fed to its rectifier in relation to one of the other two wavelengths, then the original null position of the servo operated potentiometer 48 will alter in seeking the new required balance.

The following example gives results obtained using the wavelengths and instrumentation described in detail above, except that, instead of sounding an alarm, movement of the swinger of automatic potentiometer 48 actuated a recorder which indicated the ratio of the signals.

*Example*

The transmitter-receiver and reflector were positioned 100 yards apart. Four bombs in succession were exploded about 40 yards upwind from the middle of the line connecting the two instruments. The bombs contained the following charges:

(*a*) 2.6 lb. water.
(*b*) 1.5 lb. sarin.
(*c*) 2.6 lb. sarin.
(*d*) 2.6 lb. sarin.

The wind conditions were different for tests (*c*) and (*d*). Readings of the ratios of the signals were taken over period of time extending from before the explosion of the bomb until, under the wind conditions prevailing, the gas or vapor cloud would be expected to have passed beyond the instruments. The following results were obtained:

(*a*) (Water)—the ratio indication remained substantially constant at about 1.1.

(*b*) (1.5 lb. agent)—the ratio dropped to a minimum of about 0.65 then rose again.

(*c*) (2.6 lb. agent)—the ratio dropped to a minimum of about 0.40 then rose again.

(*d*) (2.6 lb. agent)—the ratio dropped to a minimum of about 0.40 then rose again, but the rate of drop and rise were different than in (*c*).

While we have described one embodiment of our invention in considerable detail, it will be apparent that numerous changes are possible in the details of the optical and electrical components. We therefore wish our invention to be limited solely by the scope of the appended claims.

We claim:

1. A method of detecting in the atmosphere minute quantities of a compound containing a pentavalent phosphorus ester linkage comprising transmitting a beam of radiation including infra-red frequencies through the ambient atmosphere for a distance of at least about 50 yards, dispersing said beam and separating at least two narrow non-overlapping spectral bands lying in a region of eight to thirteen microns wavelength, one of said bands lying at wavelengths at which said contaminant exhibits high absorption and another of said bands lying at wavelengths at which said contaminant exhibits little or no absorption, and measuring the relative intensity of said bands.

2. A method as defined in claim 1 wherein said bands have a width of the order of 0.2 micron, one of said bands has a mean wavelength of about 9.8 microns, and another of said bands has a mean wavelength of about 9.25 microns.

3. A method as defined in claim 2 wherein said contaminant is isopropyl methylphosphono fluoridate.

4. A method of detecting the presence in the atmosphere of minute quantities of a compound containing a pentavalent phosphorus ester linkage comprising transmitting a beam including infra-red radiation through the ambient atmosphere for a distance of at least about 50 yards, dispersing said beam and separating therefrom at least three narrow, non-overlapping, spectral bands lying close together in a region of eight to thirteen microns wavelength, one of said bands being a detecting band occupying wavelengths at which said contaminant exhibits high absorption and two of said bands being reference bands occupying wavelengths at which said contaminant exhibits little or no absorption, one of said reference bands occupying greater and one occupying smaller wavelengths than said detecting band, and comparing the intensity of said detecting band with that of said reference bands.

5. A method as defined in claim 4 wherein said spectral bands have widths of the order of 0.2 micron, said detecting band has a mean wavelength of about 9.8 microns one of said reference bands has a mean wavelength of about 9.25 microns and another of said reference bands has a mean wavelength of about 10.4 microns.

6. A method as defined in claim 5 wherein said contaminant is isopropyl methylphosphono fluoridate.

7. A method of detecting in the atmosphere minute quantities of a compound having a pentavalent phosphorus ester linkage comprising transmitting a beam including infra-red radiation through the ambient atmosphere for a distance of at least about 50 yards, dispersing said beam, separating at least three closely spaced, narrow, non-overlapping spectral bands lying in a region of eight to thirteen microns wavelength, at least one of said bands being a detecting band occupying wavelengths at which said contaminant exhibits high absorption and the other bands being reference bands occupying wavelengths at which said agent exhibits little or no absorption, one of said reference bands occupying greater and one smaller wavelengths than said detection band, producing an electrical signal proportional to the intensity of each of said bands, and comparing the sum of the signals proportional to said reference bands with twice the signal proportional to said detection band.

8. Means for detecting the presence of minute quantities of an atmospheric contaminant comprising a plurality of reflectors arranged in a circle, a turntable at the center of said circle, a source of infra-red radiation and a receiver mounted adjacent to each other on said turntable, said source, reflectors, and receiver, being so arranged that radiation directed from said source to a given reflector is returned to said receiver, said receiver comprising means for dispersing said beam and detector means adapted to produce electrical signals in response to infra-red radiation, said dispersing means being constructed and arranged to deliver to said detector means at least two narrow, non-overlapping, closely positioned wavelength bands, lying within a region of high atmospheric transmission, one of said bands being a detecting band occupying wavelengths wherein said contaminant exhibits high absorption, and another of said bands occupying wavelengths wherein said contaminant exhibits little or no absorption, and means for comparing the signals produced by said detector means in response to said respective bands.

References Cited in the file of this patent

UNITED STATES PATENTS

| | | |
|---|---|---|
| 2,654,845 | Presenz | Oct. 6, 1953 |
| 2,679,184 | Atwood | May 25, 1954 |
| 2,679,185 | Atwood | May 25, 1954 |
| 2,757,568 | Fastie | Aug. 7, 1956 |
| 2,768,306 | Grubb et al. | Oct. 23, 1956 |
| 2,775,160 | Foskett et al. | Dec. 25, 1956 |
| 2,817,691 | Hutchins | Dec. 24, 1957 |

OTHER REFERENCES

"Semiconducting Materials and Filters for the Infrared," by H. F. Priest et al., Proceedings of the Conference on Infrared Optical Materials, Filters, and Films, OTS-PB121128, February 1955, pages 103 to 117.